United States Patent
Inaba et al.

(10) Patent No.: US 11,024,326 B2
(45) Date of Patent: Jun. 1, 2021

(54) INTEREST DETERMINATION SYSTEM, INTEREST DETERMINATION METHOD, AND STORAGE MEDIUM

(71) Applicant: TOYOTA JIDOSHA KABUSHIKI KAISHA, Toyota (JP)

(72) Inventors: Michimasa Inaba, Hiroshima (JP); Yuya Nawate, Hiroshima (JP); Tomoya Takatani, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 15/964,388

(22) Filed: Apr. 27, 2018

(65) Prior Publication Data

US 2018/0315440 A1    Nov. 1, 2018

(30) Foreign Application Priority Data

May 1, 2017 (JP) .............................. JP2017-091246

(51) Int. Cl.
| | |
|---|---|
| *G10L 15/16* | (2006.01) |
| *G10L 25/30* | (2013.01) |
| *G10L 25/51* | (2013.01) |
| *G06N 20/00* | (2019.01) |
| *G06F 16/2457* | (2019.01) |

(Continued)

(52) U.S. Cl.
CPC .......... *G10L 25/30* (2013.01); *G06F 16/2457* (2019.01); *G06F 40/40* (2020.01); *G06N 3/0445* (2013.01); *G06N 3/0454* (2013.01); *G06N 3/08* (2013.01); *G06N 20/00* (2019.01); *G06N 20/10* (2019.01); *G10L 25/51* (2013.01)

(58) Field of Classification Search
CPC ....................................................... G10L 25/30
USPC ............................................................. 704/9
See application file for complete search history.

(56) References Cited

U.S. PATENT DOCUMENTS

| | | | |
|---|---|---|---|
| 8,156,427 B2 * | 4/2012 | Graham .................. | G06F 16/93 715/254 |
| 8,452,772 B1 * | 5/2013 | Carpio .................... | H04L 67/02 707/737 |

(Continued)

FOREIGN PATENT DOCUMENTS

| | | |
|---|---|---|
| JP | 2017-27168 | 2/2017 |
| JP | 2017-151838 | 8/2017 |

(Continued)

*Primary Examiner* — Jakieda R Jackson
(74) *Attorney, Agent, or Firm* — Oblon, McClelland, Maier & Neustadt, L.L.P.

(57) ABSTRACT

An interest determination system includes a data acquisition unit configured to acquire a first data group indicating a feature of each word contained in user's dialog information; a first learning unit configured to learn by using a first input and output values, the first input value being set to a data group that associates the first data group with a second data group indicating a feature of a predetermined word, the first output value being set to information indicating whether there is a user's interest; and a determination unit configured to, when a data group that associates a third data group indicating a feature of a word to be determined with the first data group has been input to the first learning unit, determine whether there is a user's interest in the word to be determined, based on an output value output from the first learning unit.

12 Claims, 11 Drawing Sheets

(51) Int. Cl.
*G06N 3/04* (2006.01)
*G06N 3/08* (2006.01)
*G06N 20/10* (2019.01)
*G06F 40/40* (2020.01)

(56) References Cited

U.S. PATENT DOCUMENTS

| | | | | |
|---|---|---|---|---|
| 9,627,532 | B2* | 4/2017 | Gemello | H01L 21/823437 |
| 9,875,258 | B1* | 1/2018 | Hsiao | G06F 16/532 |
| 10,242,036 | B2* | 3/2019 | Kwon | G06K 9/4647 |
| 2008/0082426 | A1* | 4/2008 | Gokturk | G06Q 30/0623 |
| | | | | 705/26.62 |
| 2009/0172730 | A1* | 7/2009 | Schiff | G06Q 30/02 |
| | | | | 725/34 |
| 2009/0216696 | A1 | 8/2009 | Downs et al. | |
| 2011/0131041 | A1* | 6/2011 | Cortez | G10L 15/16 |
| | | | | 704/235 |
| 2013/0066887 | A1 | 3/2013 | Downs et al. | |
| 2015/0081725 | A1* | 3/2015 | Ogawa | G06Q 50/01 |
| | | | | 707/754 |
| 2015/0248651 | A1* | 9/2015 | Akutagawa | G06Q 10/1095 |
| | | | | 705/7.19 |
| 2015/0375104 | A1* | 12/2015 | Nishar | A63F 13/12 |
| | | | | 463/9 |
| 2017/0032222 | A1* | 2/2017 | Sharma | G06K 9/4619 |
| 2017/0310773 | A1* | 10/2017 | Li | H04L 67/22 |
| 2018/0136797 | A1* | 5/2018 | Dickens | G06F 16/9535 |
| 2018/0308487 | A1* | 10/2018 | Goel | G10L 15/26 |

FOREIGN PATENT DOCUMENTS

| | | |
|---|---|---|
| KR | 10-1500900 B1 | 3/2015 |
| KR | 10-1652433 B1 | 8/2016 |

\* cited by examiner

FIG. 10

| | |
|---|---|
| NUMBER OF DIALOGS | 100 |
| NUMBER OF SPEECHES PER DIALOG | 53.87 |
| NUMBER OF WORDS PER SPEECH | 40.06 |
| NUMBER OF NOUNS IN FIRST-HALF PARTS OF DIALOGS | 6279 |
| NUMBER OF INTERESTING NOUNS IN FIRST-HALF PARTS OF DIALOGS | 1530 |
| NUMBER OF NOUNS IN SECOND-HALF PARTS OF DIALOGS | 6257 |
| NUMBER OF INTERESTING NOUNS IN SECOND-HALF PARTS OF DIALOGS | 1084 |
| Fleiss' Kappa | 0.50 |

FIG. 11

| TECHNIQUE | ACCURACY | RECALL FACTOR | F-MEASURE |
|---|---|---|---|
| WORD SIMILARITY | 0.294 | 0.393 | 0.336 |
| SVM | 0.479 | 0.797 | 0.598 |
| separate shallow | 0.517 | 0.732 | 0.606 |
| separate deep | 0.523 | 0.709 | 0.602 |
| unite shallow | 0.539 | 0.716 | 0.615 |
| unite deep | 0.546 | 0.712 | 0.618 |

FIG. 12

| USER 1 | I am into Japanese pickles recently. |
| --- | --- |
| USER 2 | Well, Japanese pickles. I like yellow pickled radishes among Japanese pickles. |
| USER 1 | Sounds good. They go well with alcohol. |
| USER 2 | You drink alcohol. What is your favorite alcohol? |
| USER 1 | Whiskey is my favorite alcohol. |
| USER 2 | I sometimes drink whiskey, too. I often drink a small amount of red wine. |
| USER 1 | Do you prefer red wine to white wine? |

FIG. 13

| USER 1 | | | USER 2 | | |
| --- | --- | --- | --- | --- | --- |
| | CORRECT | ASSUMED | | CORRECT | ASSUMED |
| CHEESE | ○ | ○ | CHEESE | ○ | ○ |
| SMOKED FOOD | ○ | ○ | RAW HAM | ○ | ○ |
| MUSICAL INSTRUMENT | ○ | ○ | MUSICAL INSTRUMENT | × | × |
| GUITAR | ○ | ○ | GUITAR | × | × |
| ACCORDION | × | ○ | METALLOPHONE | × | × |
| AFFAIR | × | × | WINE | ○ | ○ |
| EXPERIENCE | × | × | ADULT | × | × |
| HEAVY METAL | ○ | ○ | REALIZATION | × | × |

FIG. 14

| USER 1 | | | USER 2 | | |
|---|---|---|---|---|---|
| | CORRECT | ASSUMED | | CORRECT | ASSUMED |
| CHEESE | ○ | ○ | CHEESE | ○ | ○ |
| SMOKED FOOD | ○ | ○ | RAW HAM | ○ | ○ |
| MUSICAL INSTRUMENT | ○ | ○ | MUSICAL INSTRUMENT | × | ○ |
| GUITAR | ○ | ○ | GUITAR | × | ○ |
| ACCORDION | × | ○ | METALLOPHONE | × | ○ |
| AFFAIR | × | × | WINE | ○ | ○ |
| EXPERIENCE | × | × | ADULT | × | × |
| HEAVY METAL | ○ | ○ | REALIZATION | × | × |

INTEREST DETERMINATION SYSTEM, INTEREST DETERMINATION METHOD, AND STORAGE MEDIUM

INCORPORATION BY REFERENCE

The disclosure of Japanese Patent Application No. 2017-091246 filed on May 1, 2017 including the specification, drawings and abstract is incorporated herein by reference in its entirety.

BACKGROUND

1. Technical Field

The disclosure relates to an interest determination system, interest determination method and storage medium that determine whether there is an interest of a user.

2. Description of Related Art

There is known a system that determines whether there is an interest of a user by using vectors each expressing a feature of a word that appears in a dialog of the user (see, for example, Japanese Unexamined Patent Application Publication No. 2017-027168 (JP 2017-027168 A)).

SUMMARY

The system determines whether there is an interest of a user by using words that appear in a dialog of the user. For this reason, it is difficult to determine whether there is an interest of a user in a word that does not appear in the dialog of the user.

The disclosure provides an interest determination system, interest determination method and storage medium that are able to determine whether there is an interest of a user in a word that does not appear in a dialog of the user.

A first aspect of the disclosure provides an interest determination system. The interest determination system includes a data acquisition unit, a first learning unit, and a determination unit. The data acquisition unit is configured to acquire a first data group indicating a feature of each word contained in dialog information on a user. The first learning unit is configured to learn by using a first input value and a first output value. The first input value is set to a data group that associates the first data group acquired by the data acquisition unit with a second data group indicating a feature of a predetermined word. The first output value is set to information indicating whether there is an interest of the user. The determination unit is configured to, when a data group that associates a third data group indicating a feature of a word to be determined with the first data group acquired by the data acquisition unit has been input to the first learning unit, determine whether there is the interest of the user in the word to be determined, based on an output value output from the first learning unit. In this aspect, the first data group that is acquired by the data acquisition unit may be first vector information that is expressed as quantified and vectorized information of the feature of each word contained in the dialog information of the user. The first learning unit may be configured to learn by using the first input value and the first output value. The first input value may be set to vector information that associates the first vector information acquired by the data acquisition unit with second vector information as the second data group indicating the feature of the predetermined word set in advance. The first output value may be set to information indicating whether there is the interest of the user. The determination unit may be configured to, when vector information that associates third vector information indicating the feature of the word to be determined with the first vector information acquired by the data acquisition unit has been input to the first learning unit, determine whether there is the interest of the user in the word to be determined, based on an output value output from the first learning unit. In this aspect, the first data group that is acquired by the data acquisition unit may be a taste model that expresses the feature of each word contained in the dialog information of the user as a model indicating a taste of the user. In this aspect, the data acquisition unit may include a word vector conversion unit and a sentence vector generating unit. The word vector conversion unit may be configured to convert an interest estimation word, a preceding context word and a following context word within the dialog information of the user into vectors of the words. The interest estimation word may be a word in which the user is interested. The preceding context word may be a word a predetermined number of words before the interest estimation word. The following context word may be a word a predetermined number of words behind the interest estimation word. The sentence vector generating unit may be configured to convert the vector of the preceding context word, converted by the word vector conversion unit, to a preceding context vector using a second learning unit and convert the vector of the following context word, converted by the word vector conversion unit, to a following context vector using the second learning unit. The preceding context vector and the following context vector each may indicate a feature of a sentence. The sentence vector generating unit may be configured to generate a connected vector obtained by connecting the converted preceding context vector and the converted following context vector to the vector of the interest estimation word. In this aspect, the sentence vector generating unit may be configured to generate the connected vector for each of pieces of dialog information in which the user is interested, and the data acquisition unit may further include a taste model generating unit configured to calculate an average of the connected vectors generated by the sentence vector generating unit as vector information of the user in the taste model. In this aspect, the interest determination system may further include a third learning unit configured to be optimized by using a second input value and a second output value. The second input value may be set to the connected vector that is generated by the sentence vector generating unit. The second output value may be set to information indicating whether there is the interest of the user. In this aspect, the first learning unit, the second learning unit and the third learning unit may be optimized at the same time. In this aspect, the first learning unit, the second learning unit and the third learning unit each may be a neural network. A second aspect of the disclosure provides an interest determination method. The interest determination method includes: acquiring a first data group indicating a feature of each word contained in dialog information on a user; causing a first learning unit to learn by using a first input value and a first output value, the first input value being set to a data group that associates the first data group with a second data group indicating a feature of a predetermined word, the first output value being set to information indicating whether there is an interest of the user; and, when a data group that associates a third data group indicating a feature of a word to be determined with the first data group has been input to the first learning unit, determining whether there is the interest of the user in the word to be determined, based on an output value output from the first learning unit. A third aspect of the disclosure provides a computer-readable storage medium storing a computer program that causes a computer to execute instructions for: acquiring a first data group indicating a feature of each word contained in dialog information on a user; causing a first learning unit to learn by using a first input value and a first output value, the first input value being set to a data group that associates the first data group with a second data group indicating a feature of a predetermined word, the first output value being set to information indicating whether there is an interest of the user; and, when a data group that associates a third data group indicating a feature of a word to be determined with the first data group has been input to the first learning unit, determining whether there is the interest of the user in the word to be determined, based on an output value output from the first learning unit.

According to the aspects of the disclosure, it is possible to provide the interest determination system, interest determination method and storage medium that are able to highly accurately determine whether there is an interest of a user also in a word that does not appear in a dialog of the user.

BRIEF DESCRIPTION OF THE DRAWINGS

Features, advantages, and technical and industrial significance of exemplary embodiment will be described below with reference to the accompanying drawings, in which like numerals denote like elements, and wherein:

FIG. 10 is a table that shows an example of statistical information of data used;

FIG. 11 is a table that shows test results;

FIG. 12 is a view partially excerpted from the first half of a dialog used in a test;

FIG. 13 is a table that shows part of results from estimation of a potential interest with the use of a unite model; and FIG. 14 is a table that shows part of results from estimation with the use of an SVM.

DETAILED DESCRIPTION OF EMBODIMENTS

Figure 1:
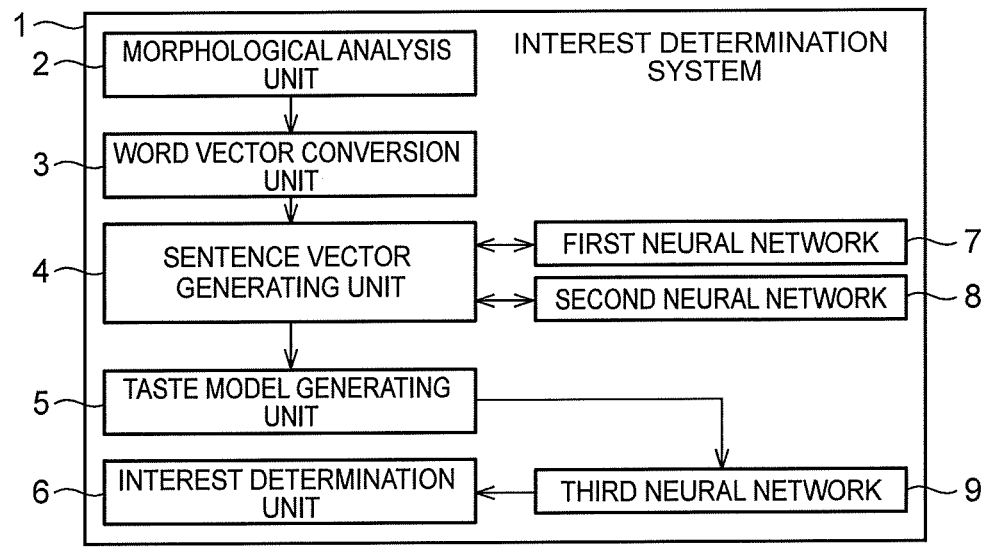
FIG. 1 is a block diagram that shows the schematic system configuration of an interest determination system according to an embodiment of the disclosure.

Hereinafter, embodiments of the disclosure will be described with reference to the accompanying drawings. An interest determination system according to an embodiment of the disclosure is able to highly accurately determine an interest of a user in a potential word in which the user is likely to express interest even when the word has not appeared in a user's dialog log (dialog information) yet (hereinafter, potential interest word).

For example, whether there is an interest of a user has been determined by using words that appear in a dialog of the user so far. For example, it has been difficult to determine whether there is an interest of a user in a word that does not appear in the dialog of the user.

In contrast, the interest determination system according to the present embodiment acquires a taste model that is vector information indicating a feature of each word contained in user's dialog information and that indicates a taste of the user. The interest determination system causes a learning device (a third neural network 9 (described later)) to learn by using an input value and an output value while the input value is set to vector information, that associates vector information of the acquired taste model with vector information indicating a feature of a predetermined word set in advance and the output value is set to information indicating whether there is an interest of the user. When vector associating vector information indicating a feature of a word to be determined and the vector information of the taste model has been input to the learning device, the interest determination system determines whether there is an interest of the user in the word to be determined, based on an output value output from the learning device. Learning means optimizing a neural network.

In the interest determination system according to the present embodiment, as described above, the learning device (learning means) is caused to learn by using the vector information that associates a taste model that comprehensively compiles a taste of the user with a selected one predetermined word that has not appeared in the dialog information yet. Therefore, not only a taste based on words that appear in the dialog information and in which the user expresses interest but also a taste based on a predetermined word, including a word that does not appear in the dialog information and in which the user expresses interest, is incorporated in the learning device. That is, when it is determined whether there is an interest of the user in a word to be determined with the use of the learning device, it is possible to highly accurately determine whether there is an interest of the user in not only a word that appears in a dialog of the user but also a word that does not appear in the dialog.

In the present embodiment, as described above, the predetermined word set in advance and the word to be determined may be the same or may be different. The interest determination system 1 according to the present embodiment is able to accurately determine whether there is an interest of a user even in the latter different case.

In determination as to a word, such as a noun, that does not appear in a dialog log, it is conceivable that an interest of a user in a subject in the dialog log is the key to the determination. In the present embodiment, initially, it is determined whether a user is interested in each word in a dialog log, as will be described later. It is presumable that whether a user is interested in a word significantly depends on a context before the word and a context behind the word. Therefore, in the present embodiment, it is determined whether a user is interested in a word in consideration of a context before the word and a context behind the word.

FIG. 1 is a block diagram that shows the schematic system configuration of the interest determination system according to the embodiment of the disclosure. The interest determination system 1 according to the present embodiment includes a morphological analysis unit 2, a word vector conversion unit 3, a sentence vector generating unit 4, a taste model generating unit 5, an interest determination unit 6, and first to third neural networks 7, 8, 9. The morphological analysis unit 2 performs morphological analysis. The word vector conversion unit 3 converts a word into a vector. The sentence vector generating unit 4 generates a sentence vector. The taste model generating unit 5 generates a taste model. The interest determination unit 6 determines whether there is an interest of a user. The first to third neural networks 7, 8, 9 serve as a learning device.

The interest determination system 1 has a hardware configuration mainly including a microcomputer. The microcomputer includes, for example, a central processing unit (CPU), a memory, an interface unit (I/F), and the like. The CPU executes arithmetic processing, or the like. The memory includes a read only memory (ROM) and a random access memory (RAM). Operation programs, and the like, that are executed by the CPU are stored in the ROM or the RAM. The interface unit inputs or outputs signals from or to external devices. The CPU, the memory and the interface unit are connected to one another via a data bus, or the like.

The morphological analysis unit 2 performs morphological analysis on a dialog log (text information of a dialog). A dialog log is stored in, for example, the memory. A dialog log may be configured to be input to the morphological analysis unit 2 via an input device, or the like, as needed. The morphological analysis unit 2 divides a dialog log into morphemes (words), and generates a string of words, that is, an aggregate of words. The morphological analysis unit 2 performs morphological analysis by using, for example, MeCab (Japanese language morphological analysis system).

The word vector conversion unit 3 converts meanings of words into numbers by converting a string of words into word vectors indicating a meaning of the string of words. The word vector conversion unit 3 converts a string of words, generated by the morphological analysis unit 2, into a word vector sequence. The word vector conversion unit 3 converts a string of words, generated by the morphological analysis unit 2, into a d-dimensional word vector sequence $x=(x1, x2, \ldots, x_t, xk)$ by using, for example, Word2Vec [Mikolov13] (quantification technique that expresses a word by vectorizing the word). An interest estimation word $x_t$ is, for example, a word in which a user is estimated to be interested, and is set in the memory, or the like, in advance.

The sentence vector generating unit 4 collects a meaning of a sentence of a word vector sequence by converting the word vector sequence to a sentence vector indicating a feature of the sentence. The sentence vector generating unit 4 converts a word vector sequence, converted by the word vector conversion unit 3, into a sentence vector sequence.

A method of converting a word vector sequence into a sentence vector sequence will be described in detail by using a specific example. It is presumable that words around an interest estimation word $x_t$ are useful for estimating an interest of a user. For this reason, the sentence vector generating unit 4 uses vectors of J words before and behind the interest estimation word $x_t$ as a context.

That is, the sentence vector generating unit 4 converts a vector sequence $x^f=(x_{t-J}, x_{t-J+1}, \ldots, x_{t-1})$ of words before the interest estimation word $x_t$ and a vector sequence $x^s=(x_{t+1}, x_{t+2}, \ldots, x_{t+J})$ of words behind the interest estimation word $x_t$ by using the first neural network 7.

The first neural network 7 is a specific example of a second learning unit. The first neural network 7 is, for example, a recurrent neural network (RNN). The RNN has a long short term memory (LSTM) in an intermediate layer. Instead of the first neural network 7, another learning device, such as a support vector machine (SVM), may be used. As will be shown in the test results later, using the RNN first neural network 7 is desirable because of high determination accuracy.

At the time of an input into the first neural network 7, <EOS> that means the terminal end of each word vector sequence is inserted. This <EOS> is also a vector. One-dimensional element to d-dimensional element of the vector are zero, and a (d+1)-dimensional element of the vector is 1. The word vector sequences are sequentially input to the first neural network 7, and an output of the first neural network 7 at the time when the <EOS> vector has been input is a sentence vector.

Figure 2:
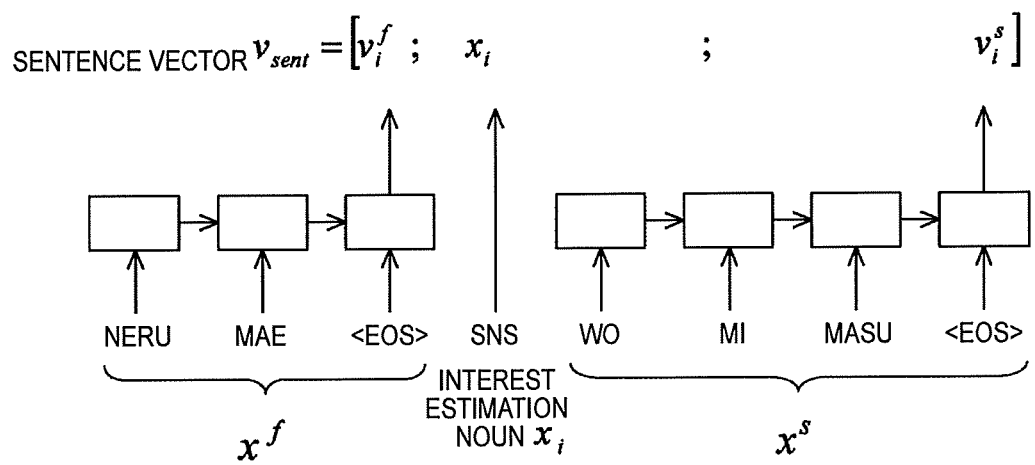
FIG. 2 is a view that shows an example of generating a sentence vector from a dialog log.

The sentence vector generating unit 4 converts the word vector sequence $x^f$ into a sentence vector sequence $v_i^f$ neural network 7, and converts the word vector sequence $x^s$ into a sentence vector sequence $v_i^s$ with the use of the first neural network 7. For example, as shown in FIG. 2, the sentence vector generating unit 4 generates a sentence vector based on a dialog log that "NERU MAE SNS WO MI MASU". The dialog log "NERU MAE SNS WO MI MASU" is written in Japanese pronunciation using alphabet for explanation. The dialog log "NERU MAE SNS WO MI MASU" means that I check SNS before going to bed. In the dialog log, an interest estimation word in this dialog log is "SNS". Although the words in FIG. 2 are written in Japanese pronunciation, the words are actually vectors converted with the use of word2vec, or the like.

At first, the sentence vector generating unit 4 inputs the word vector sequence $x^f$ ("NERU", "MAE", "<EOS>") into the first neural network 7 on a word-by-word basis from the beginning of the sentence, and sets a preceding context vector $v^f$ to an output of the first neural network 7 at the time when <EOS> has been input. Similarly, the sentence vector generating unit 4 generates a following context vector $v_i^s$ based on the word vector sequence $x^s$ ("WO", "MI", "MASU", "<EOS>"). The sentence vector generating unit 4 does not input the interest estimation word ("SNS") into the first neural network 7, and directly utilizes the word vector as the interest estimation word $x_t$.

Subsequently, the sentence vector generating unit 4 generates a connected vector $v_{sent}=[v^f; x_t; v^S]$. The connected vector $v_{sent}$ is obtained by connecting the preceding context vector $v^f$, a vector of the interest estimation word $x_t$, and the following context vector $v^S$. The semicolon represents a combination of vectors. The same applies to the following description. The sentence vector generating unit 4 determines whether there is an interest of the user in the interest estimation word $x_t$ by using the connected vector $v_{sent}$. The sentence vector generating unit 4 inputs the connected vector $v_{sent}$ to the second neural network 8.

The second neural network 8 is a specific example of a third learning unit. The second neural network 8 is a two-dimensional probability distribution. The second neural network 8 outputs a probability of "interest; yes" that the user is interested in the interest estimation word $x_t$ and a probability of "interest; no" that the user is not interested in the interest estimation word $x_t$. The second neural network 8 may be configured to output only a probability of "interest; yes".

Instead of the second neural network 8, another learning device, such as a support vector machine (SVM), may be used. As shown by the test results later, using the fully connected layer second neural network 8 is more desirable because of high determination accuracy.

Figure 3:
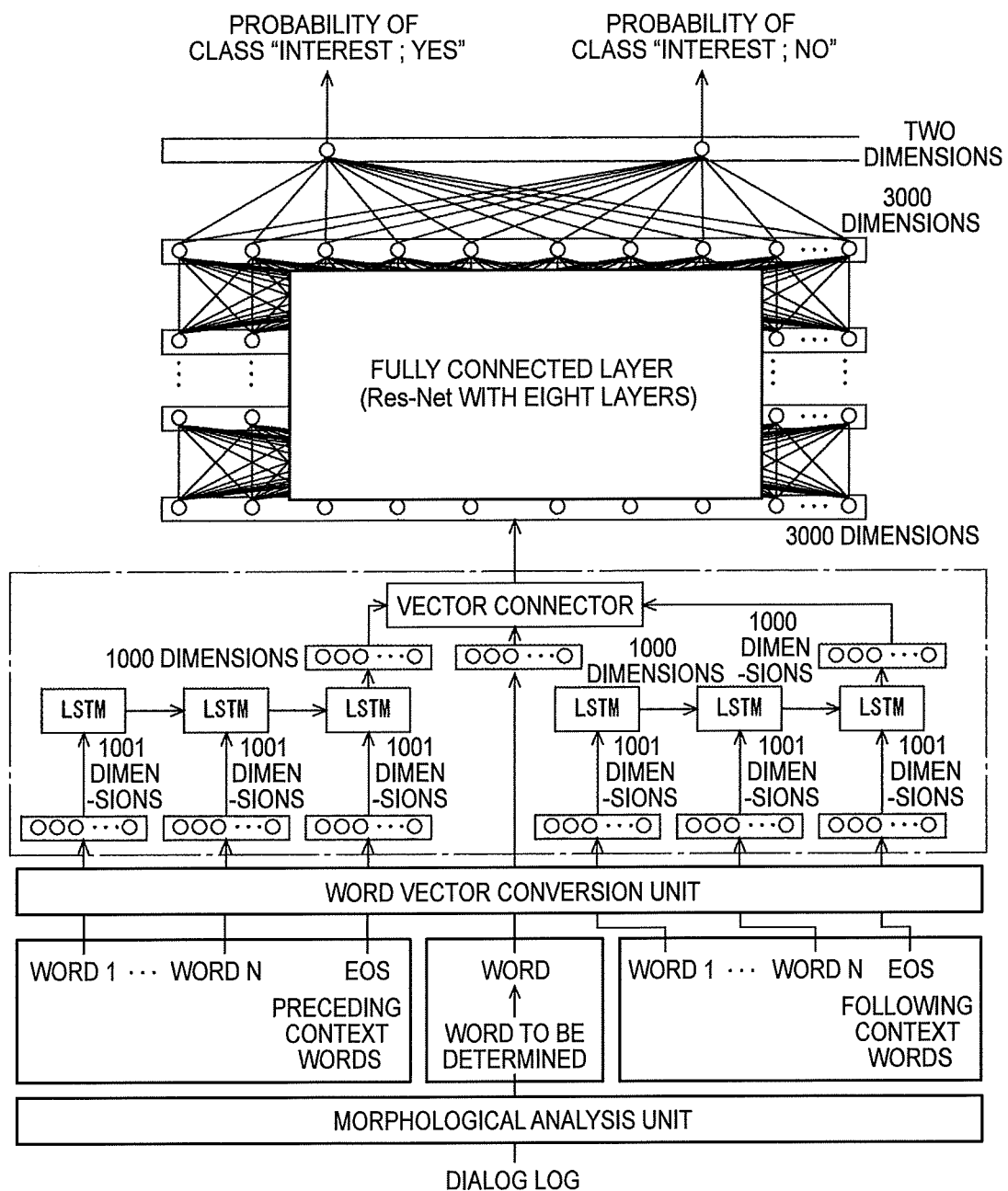
FIG. 3 is a view for showing the structures of first and second neural networks.

FIG. 3 is a view for showing the structures of the first and second neural networks 7, 8. As shown in FIG. 3, the morphological analysis unit 2 performs morphological analysis on a dialog log, and outputs an interest estimation word (word to be determined), preceding context words before the word to be determined (Word 1, ..., Word N, EOS) and following context words behind the word to be determined (Word 1, ..., Word N, EOS) to the word vector conversion unit 3. The word vector conversion unit 3 converts the preceding context words, the interest estimation word and the following context words, output from the morphological analysis unit 2, to word vector sequences, and outputs the converted word vector sequences to the sentence vector generating unit 4.

The sentence vector generating unit 4 inputs the word vector sequences of the preceding context words and the word vector sequences of the following context words, output from the word vector conversion unit 3, to the first neural network 7. The first neural network 7 outputs a preceding context vector and a following context vector in response to the input. The sentence vector generating unit 4 generates a connected vector $v_{sent}$ by connecting the preceding context vector and the following context vector, which are output from the first neural network 7, to the vector of the interest estimation word with the use of a vector connector, and inputs the generated connected vector $v_{sent}$ to the second neural network 8.

The second neural network 8 is configured as, for example, a fully connected layer (Res-Net with eight layers). The second neural network 8 outputs a probability of two-dimensional class "interest; yes" and a probability of two-dimensional class "interest; no" in response to the input.

The sentence vector generating unit 4 optimizes the first and second neural networks 7, 8 by using data for learning, stored in, for example, the memory, or the like.

Figure 4:
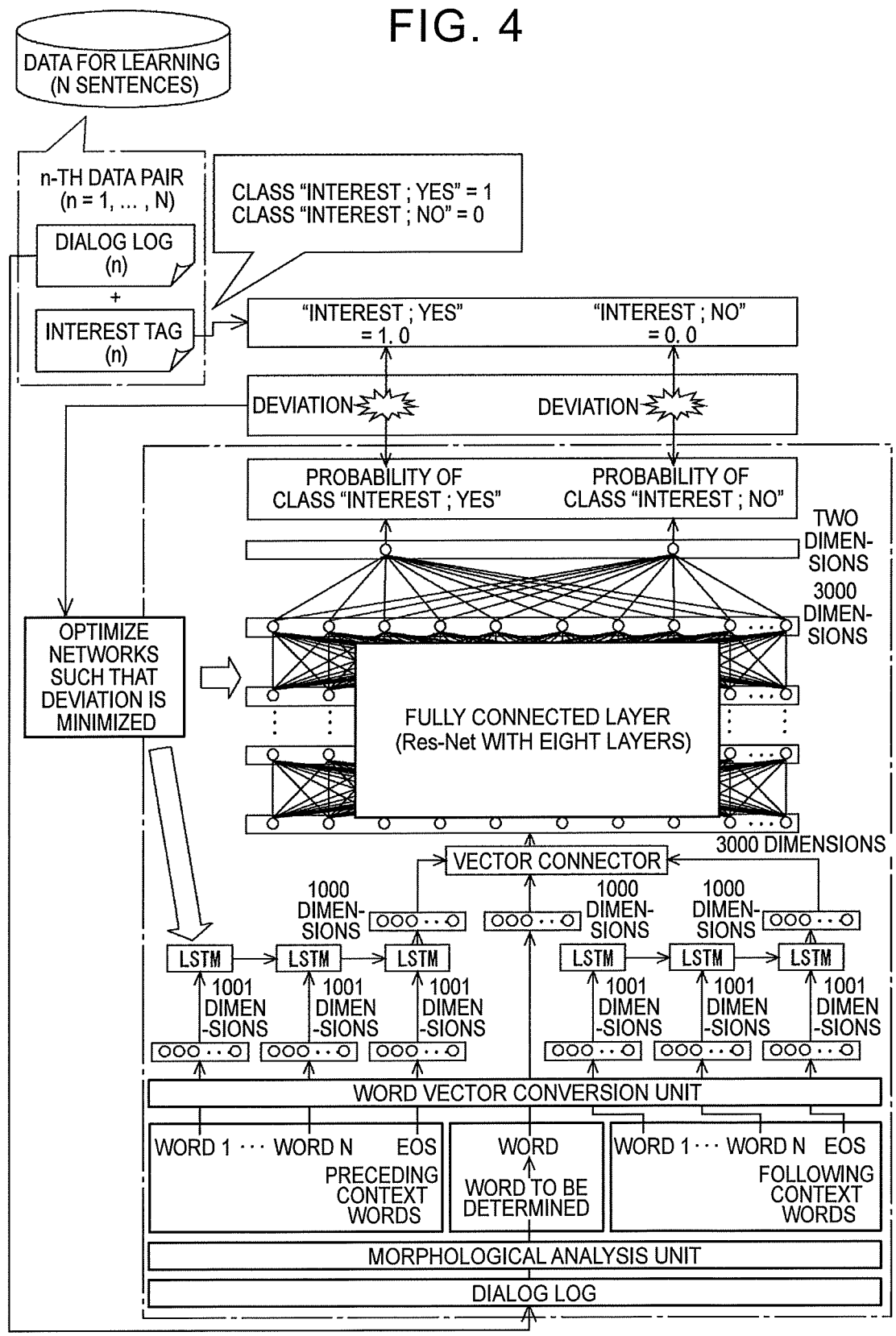
FIG. 4 is a view for showing a method of optimizing each of the first and second neural networks.

FIG. 4 is a view for showing a method of optimizing the first and second neural networks. Data for learning are, for example, data in which a dialog log (n) is associated with an interest tag (n) that indicates an interest of the user in the dialog log (n) (n=1, ..., N). In the case of the class "interest; yes", the interest tag (n) is set to 1 (Interest tag (n)=1). In the case of the class "interest; no", the interest tag (n) is set to 0 (Interest tag (n)=0).

As shown in FIG. 4, the above-described process is repeated on all the dialog logs (n) (n=1, ..., N), and further repeated an epoch number. Thus, the first and second neural networks 7, 8 are optimized. At this time, the sentence vector generating unit 4 optimizes the first and second neural networks 7, 8 such that a deviation between each of the probability of the class "interest; yes" and the probability of the class "interest; no", which are output from the second neural network 8 for each dialog log (n), and the interest tag (n) associated with the dialog log (n) is minimized.

The sentence vector generating unit 4 determines whether there is an interest of the user in the interest estimation word $x_t$ based on the optimized second neural network 8. The connected vector $v_{sent}$, on which the sentence vector generating unit 4 has determined at this time that the user is interested, may be regarded as the key to estimating a potential interest, which is a main purpose. Therefore, when the sentence vector generating unit 4 has determined that the user is interested, the sentence vector generating unit 4 saves the connected vector $v_{sent}$ in the memory, or the like. As will be described later, the interest determination system 1 according to the present embodiment generates a taste model based on the connected vector $v_{sent}$ saved in the memory, and then determines whether there is an interest of the user in a word to be determined, based on the taste model.

The taste model generating unit 5 generates a taste model that expresses a taste of the user. Thus, it is possible to compile word information in which the user is interested. That is, the taste model is information in which a taste of the user is comprehensively compiled. Therefore, by using the taste model that highly accurately reflects a taste of the user, it is possible to highly accurately determine whether there is an interest of the user, as will be described later.

Next, a method of generating a taste model will be described in detail. A taste model is information in which pieces of vector information indicating features of words contained in a dialog log of each user are classified on a user-by-user basis. The taste model generating unit 5 generates a taste model based on the connected vector $v_{sent}$ generated by the sentence vector generating unit 4.

The taste model generating unit 5 calculates, for example, an average of connected vectors $v_{sent}$ of each user as a taste model based on the connected vectors $v_{sent}$ saved in the memory. In this way, by calculating an average of connected vectors $v_{sent}$, it is possible to generate a taste model that further highly accurately expresses a taste of a user. By using the taste model, it is possible to further highly accurately determine whether there is an interest of the user in a word to be determined, as will be described later.

The taste model generating unit 5 calculates an average of connected vectors $v_{sent}$ of each user as a taste model; however, a taste model is not limited to an average of connected vectors $v_{sent}$ of each user. For example, the taste model generating unit 5 may calculate an added value obtained by adding the connected vectors $v_{sent}$ saved in the memory, as a taste model. In addition, the taste model generating unit 5 may weight each of the connected vectors $v_{sent}$ saved in the memory and then calculate an added value as a taste model. As long as a taste of a user is further highly appropriately incorporated in a taste model, any calculation method may be applied.

Figure 5:
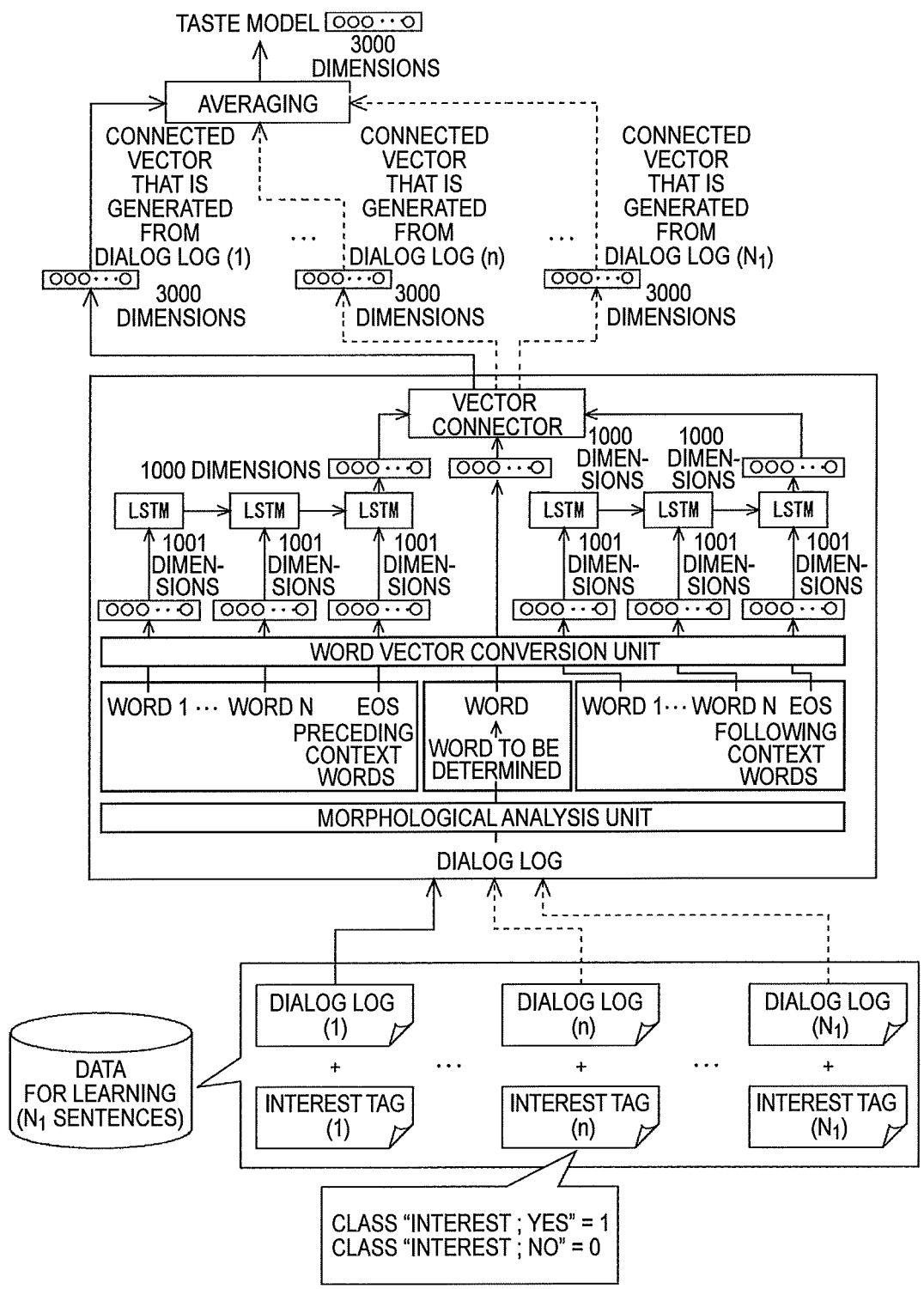
FIG. 5 is a view that shows an example of a process of generating a taste model.

FIG. 5 is a view that shows an example of a process of generating a taste model. For example, as shown in FIG. 5, the morphological analysis unit 2 performs morphological analysis on a dialog log (1) to a dialog log ($N_1$) that are data for learning (interest tag=1 (it is determined that there is an interest)), and outputs preceding context words, an interest estimation word and following context words to the word vector conversion unit 3. The word vector conversion unit 3 converts the preceding context words, the interest estimation word and the following context words, output from the morphological analysis unit 2, to word vector sequences, and outputs the converted word vector sequences to the sentence vector generating unit 4.

The sentence vector generating unit 4 inputs the word vector sequences of the preceding context words and following context words, output from the word vector conversion unit 3, to the optimized first neural network 7. The optimized first neural network 7 outputs a preceding context vector and a following context vector in response to the input. The sentence vector generating unit 4 connects the preceding context vector and the following context vector, which are output from the optimized first neural network 7, to the vector of the interest estimation word with the use of the vector connector, and generates a connected vector $v_{sent}$.

As described above, the vector connector of the sentence vector generating unit 4 generates a connected vector $v_{sent}$ for each of the dialog log (1) to the dialog log ($N_1$), and outputs the connected vectors $v_{sent}$.

The taste model generating unit 5 generates a taste model by calculating an average of the connected vector $v_{sent}$ of the dialog log (1) to the connected vector $v_{sent}$ of the dialog log ($N_1$), output from the vector connector. A taste model may be stored in the memory, or the like, in advance. In this case, the interest determination unit 6 may be configured to load the taste model stored in the memory as needed.

The interest determination unit 6 determines whether there is an interest of a user in a word not contained in the dialog logs by determining whether there is an interest of the user in a selected word to be determined. The interest determination unit 6 is a specific example of a determination unit. The interest determination unit 6 determines whether there is an interest of a user in a selected word by using the third neural network 9 based on a taste model generated by the taste model generating unit 5. The third neural network 9 is a specific example of a first learning unit.

Figure 6:
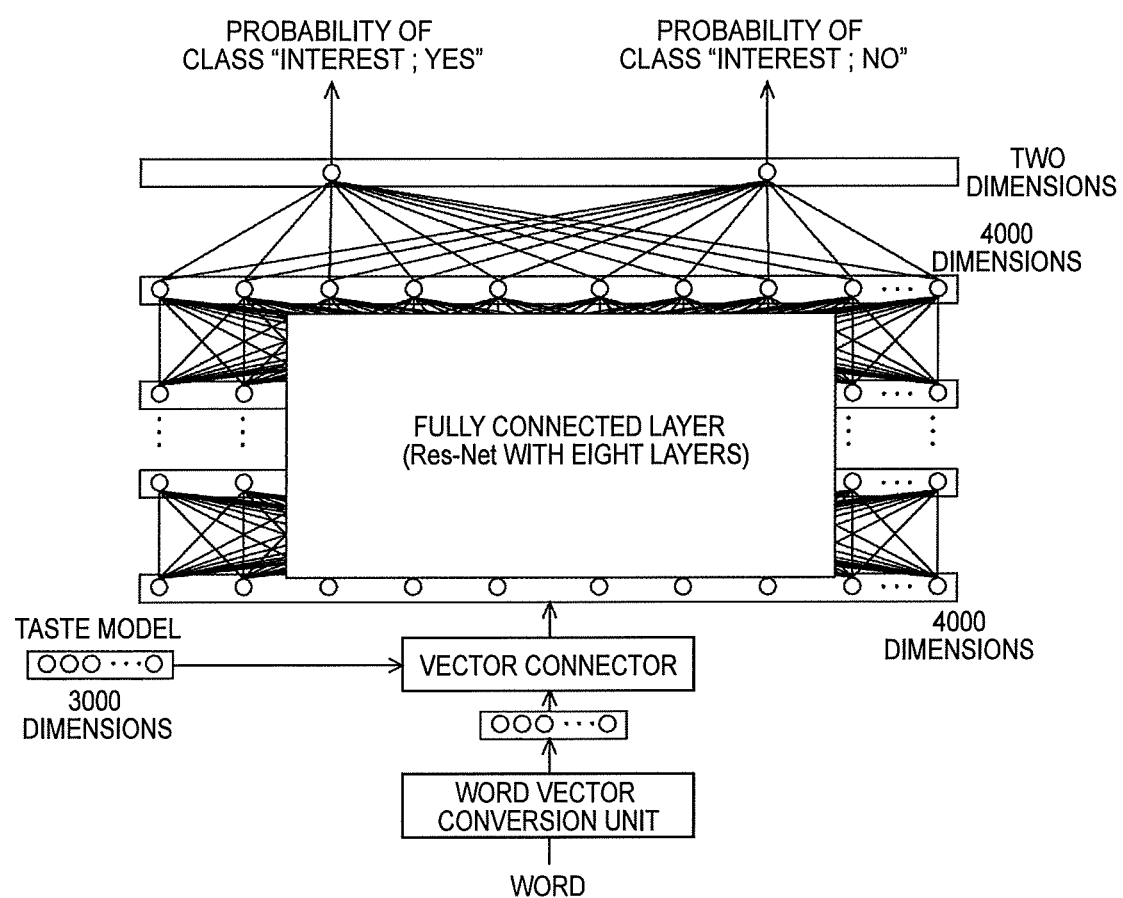
FIG. 6 is a view that shows the structure of a third neural network.

FIG. 6 is a view that shows the structure of the third neural network. The third neural network 9, as well as, for example, the second neural network 8, is configured as a fully connected layer (Res-Net with eight layers).

Instead of the third neural network 9, another learning device, such as a support vector machine (SVM), may be used. As shown by the test results later, using the fully connected layer third neural network 9 is the most desirable because of high determination accuracy.

The word vector conversion unit 3 converts a word into a word vector sequence, and outputs the converted word vector sequence to the sentence vector generating unit 4. The vector connector of the sentence vector generating unit 4 generates a connected vector obtained by connecting the word vector sequence, output from the word vector conversion unit 3, to an average of the connected vectors $v_{sent}$, that is, the taste model, output from the taste model generating unit 5. The vector connector of the sentence vector generating unit 4 inputs the connected vector to the third neural network 9. The reason why an average of the connected vectors $v_{sent}$, that is, the taste model, is connected to the word vector sequence of the word means to impart the taste of the taste model to the word. The taste of the taste model is incorporated in the word by this connection.

For example, an average of connected vectors $v_{sent}$ for a user $u_j$ (j=0, 1, . . . ) is denoted by $a_{uj}$. A word vector sequence of a selected word is denoted by $w_{uj} = w_1^{uj}$, $w_2^{uj}, \ldots, w_n^{uj}$). The vector connector generates a connected vector $[a_{uj}; w_i^{uj}]$ obtained by connecting the average $a_{uj}$ of the connected vectors $v_{sent}$ to the word vector sequence $w_{uj}$. The vector connector inputs the connected vector $[a_{uj}; w_i^{uj}]$ to the third neural network 9. The third neural network 9 outputs a probability of the two-dimensional class "interest; yes" and a probability of the two-dimensional class "interest; no" in response to the input. The third neural network 9 may be configured to output only a probability of "interest; yes" in response to the input.

The interest determination unit 6 optimizes the third neural network 9 configured as described above. The interest determination unit 6 optimizes the third neural network 9 by using data for learning, stored in, for example, the memory, or the like.

Figure 7:
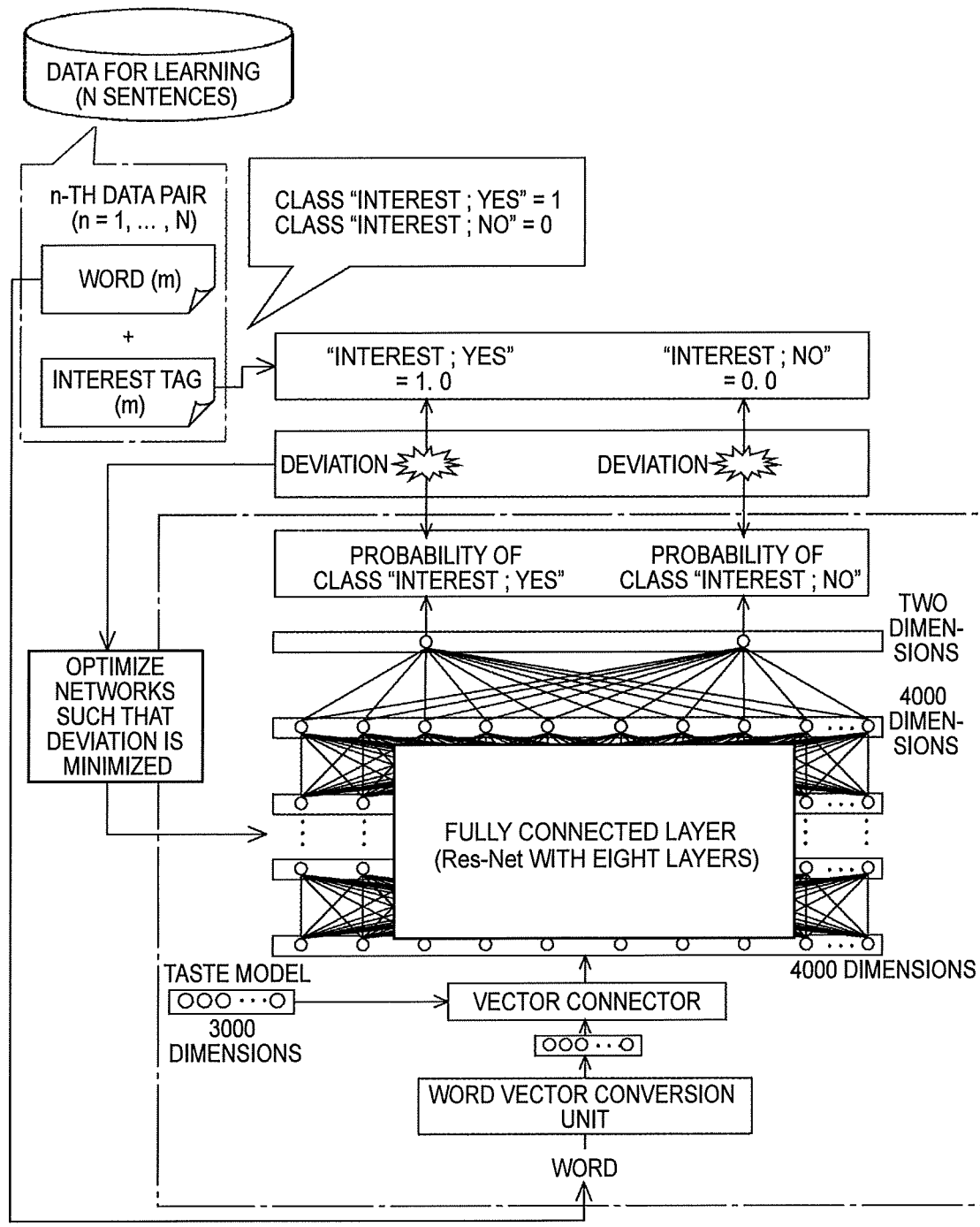
FIG. 7 is a view for showing a method of optimizing the third neural network.

FIG. 7 is a view for showing a method of optimizing the third neural network. Data for learning, which are used to optimize the third neural network 9, are, for example, data in which a predetermined word (m) is associated with an interest tag (m) indicating an interest of a user in the predetermined word (m) (m=1, . . . , M). The predetermined word is, for example, any word including a word that does not appear in a dialog log of the user.

In the case of the class "interest; yes", the interest tag (m) is set to 1 (Interest tag (m)=1). In the case of the class "interest; no", the interest tag (m) is set to 0 (Interest tag (m)=0). The data for learning are stored in, for example, the memory, or the like, in advance.

As shown in FIG. 7, the above-described process is repeated on all the predetermined words (m) (m=1, . . . , M), and further repeated an epoch number. Thus, the third neural network 9 is optimized. At this time, the interest determination unit 6 optimizes the third neural network 9 such that a deviation between each of the probability of the class "interest; yes" and the probability of the class "interest; no", which are output from the third neural network 9 for each predetermined word (m), and the interest tag (m) associated with the predetermined word (m) is minimized.

The interest determination unit 6 determines whether there is an interest of a user in a word to be determined, based on the taste model generated by the taste model generating unit 5, with the use of the optimized third neural network 9.

The reason why an average of the connected vectors $v_{sent}$, that is, the taste model, is connected to the word vector sequence of the predetermined word means to impart the taste of the taste model to the predetermined word. The taste of the taste model is incorporated in the predetermined word by this connection. Since the predetermined word is any word including a word that does not appear in the dialog log, it is possible to incorporate the taste of the user also in the word that does not appear in the dialog log. In this way, by optimizing the third neural network 9 using the generated data for learning and then using the optimized third neural network 9, it is possible to highly accurately determine whether there is an interest of the user not only in a word that appears in a dialog of the user but also in a word that does not appear in the dialog.

Figure 8:
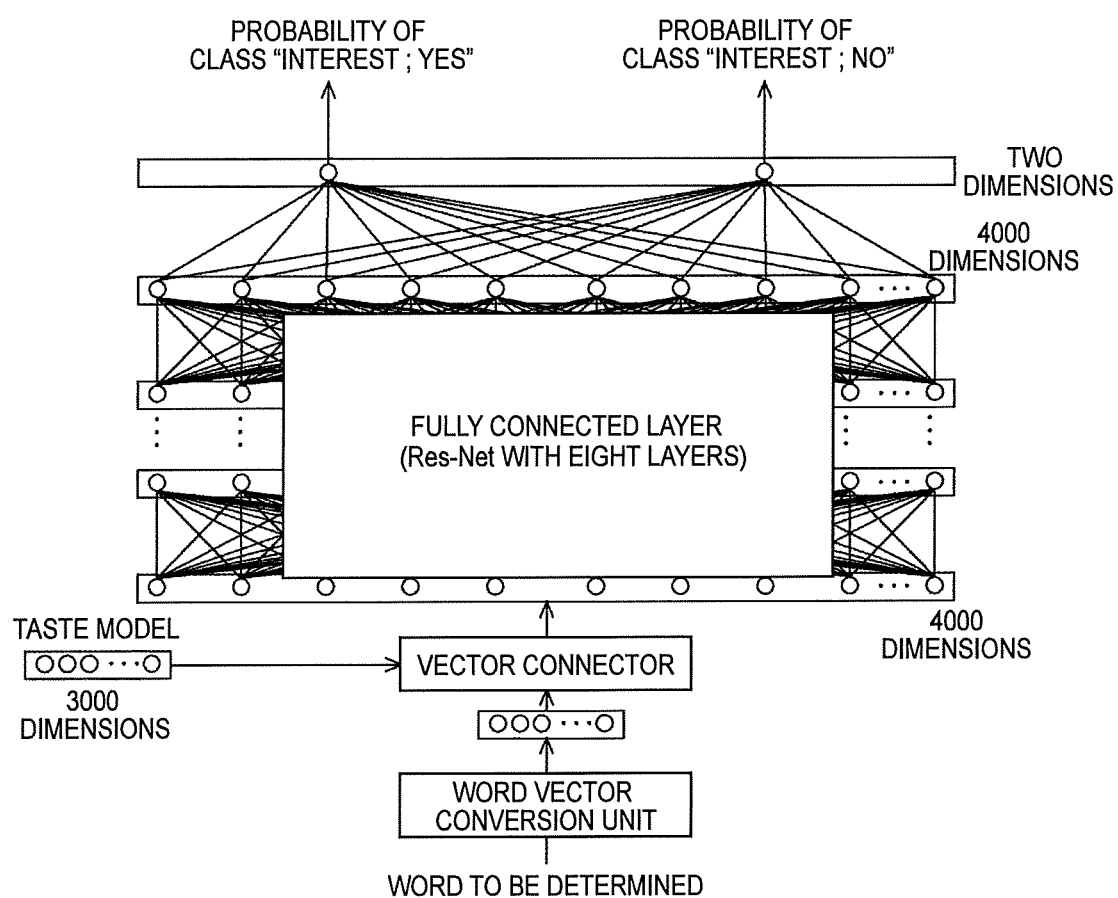
FIG. 8 is a view for showing a method of determining whether there is an interest of a user in a word to be determined.

FIG. 8 is a view for showing a method of determining whether there is an interest of a user in a word to be determined. The word vector conversion unit 3 converts a word to be determined into a word vector sequence, and outputs the converted word vector sequence to the sentence vector generating unit 4. The vector connector of the sentence vector generating unit 4 generates a connected vector $[a_{uj}; w_i^{uj}]$. The connected vector $[a_{uj}; w_i^{uj}]$ is obtained by connecting a word vector sequence $w_{uj}$, output from the word vector conversion unit 3, to an average $a_{uj}$ of the connected vectors $v_{sent}$, that is, the taste model, output from the taste model generating unit 5.

The sentence vector generating unit 4 inputs the generated connected vector $[a_{uj}; w_i^{uj}]$ to the third neural network 9. The third neural network 9 outputs a probability of the two-dimensional class "interest; yes" and a probability of the two-dimensional class "interest; no" in response to the input. The output of the third neural network 9 is a two-dimensional probability distribution as to whether there is an interest, as in the case where an interest in a word contained in a dialog log is estimated. The interest determination unit 6 is able to determine whether there is a potential interest in a word to be determined, based on the probability of the class "interest; yes" and the probability of the class "interest; no", which are output from the third neural network 9.

In the present embodiment, the first to third neural networks 7, 8, 9 may be not independent of one another, and may be linked with one another. That is, an input of the third neural network 9 may vary with an output of the first and second neural networks 7, 8.

In addition, in order to cause these first to third neural networks 7, 8, 9 to efficiently learn, for example, the sum of a deviation from a correct answer at the time of the optimization of the second neural network 8 and a deviation from a correct answer at the time of the optimization of the third neural network 9 is defined as a loss function. In this way, by optimizing the first to third neural networks 7, 8, 9 using the loss function at the same time, it is possible to extract an appropriate sentence vector from a dialog log and also accurately determine whether there is an interest in a potential interest word.

Figure 9:
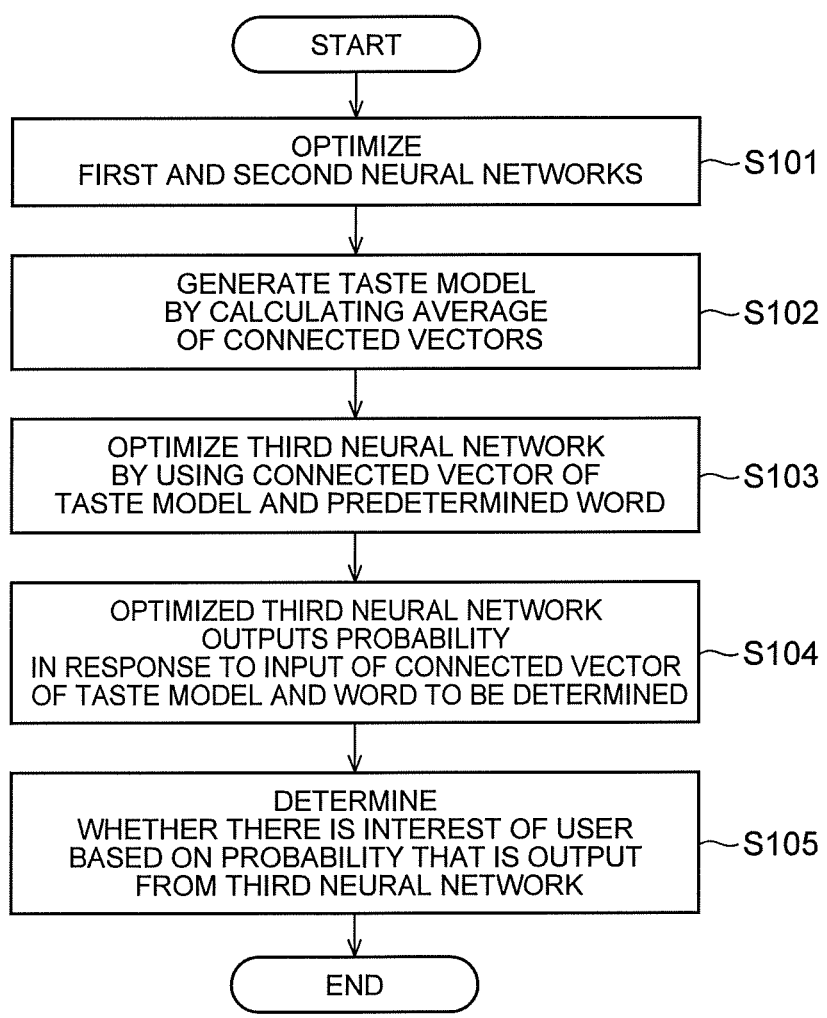
FIG. 9 is a schematic flowchart that shows the flow of an interest determination method according to an embodiment of the disclosure.

Next, the flow of an interest determination method that is executed by the interest determination system 1 according to the present embodiment will be described. FIG. 9 is a schematic flowchart that shows the flow of the interest determination method according to the present embodiment.

The first and second neural networks 7, 8 are optimized based on dialog logs of a user (step S101).

The taste model generating unit 5 generates a taste model by calculating an average of connected vectors $v_{sent}$ obtained by connecting sentence vectors that are output from the optimized first neural network 7 (step S102).

The third neural network 9 learns by using a connected vector obtained by connecting the average of the connected vectors, that is, the taste model, to a vector of a predetermined word set in advance, and is optimized (step S103).

As the optimized third neural network 9 receives the vector obtained by connecting the vector of the word to be determined to the average of the connected vectors, that is, the taste model, the optimized third neural network 9 outputs a probability of the class "interest; yes" and a probability of the class "interest; no" (step S104).

The interest determination unit 6 determines whether there is an interest of the user in the word to be determined, based on the probability of the class "interest; yes" and the probability of the class "interest; no", which are output from the optimized third neural network 9 (step S105).

A performance evaluation test was carried out by using dialog data of two users in the interest determination system 1 according to the present embodiment. The test results will be described below.

A label that means whether there is an interest of a user is assigned to all the nouns in the dialog data. In the performance evaluation test, the dialog data is processed as follows. Each piece of the dialog data is divided into two equal parts by the number of speeches contained in each dialog. The first half of each piece of the dialog data is defined as a dialog log to be supplied to the interest determination system 1. A noun in the second half of each piece of the dialog data is defined as a noun for estimating a potential interest (the second-half dialog data are not supplied to the interest determination system 1). The interest determination system 1 according to the present embodiment is evaluated as follows. The noun for estimating a potential interest is given to each user from the viewpoint that the noun is contained in which user's speech in the second-half dialog data, and it is determined whether a user who made a speech including the noun expresses interest in the noun.

The dialog data used in the test will be described in detail. As for the dialog data, test subjects were recruited via a cloud sourcing service, and 100 pieces of data, each including a one-hour dialog, were collected. For learning and evaluation, an annotation as to whether an annotator is interested was assigned to all the nouns contained in the collected dialog data. The nouns were automatically extracted by the morphological analysis unit 2. Each annotator was given the dialog data and nouns used in the dialog, and assigned any one of two labels, that is, "interested" or "indeterminate or uninterested", to each noun. A criterion for assignment was an assumed answer of the annotator who spoke words including a noun intended for annotation at the time when the annotator was asked questions, that is, "Are you interested in ( ) (the intended noun is inserted)?" or "Are you interested in a subject about ( ) (the intended noun is inserted)?". When the meaning of the sentence did not make sense in Japanese at the time when a noun was inserted in the parentheses of the question, the label "indeterminate or uninterested" was assigned. Based on the above criteria, the recruited ten annotators individually annotated, and a correct label was determined based on majority rule. When the number of the labels "interested" and the number of the labels "indeterminate or uninterested" were equal to each other (each are five), the label "indeterminate or uninterested" was assigned. FIG. 10 is a view that shows an example of statistical information of the data used. Fleiss'Kappa that indicates the degree of coincidence of annotation among the annotators was 0.50, and indicated a coincidence of medium degree.

Next, the settings of the test will be described in detail. Word2Vec was set such that a window size is five, a minimum appearance frequency is 10 and the number of dimensions of a vector is 1000, and then learning was performed by using data of about 100 GB. Preceding five words before an interest estimation noun and following five words behind the interest estimation noun were used for encoding into a context vector (J=5). An input layer of RNN (first neural network 7) that performs encoding into a context vector had 1001 dimensions. An input layer of the second neural network 8 for estimating an interest in a noun contained in a dialog had 3000 dimensions. An input layer of the third neural network 9 for estimating a potential interest had 4000 dimensions. Each of the other intermediate layers had 1000 dimensions. A dropout was applied to all the intermediate layers, and a dropout rate was set to 30%. A learning epoch number was set to 30, and evaluation was made based on the accuracy of determining "interested", a recall factor and an F-measure in ten-fold cross-validation.

Next, a comparison technique will be described in detail. In order to evaluate the technique according to the present embodiment, a unite model that updates two neural networks at the same time, a separate model that separates the third neural network 9 for estimating a potential interest, a shallow model in which the number of layers of each of the first to third neural networks 7, 8, 9 is set to one, and a deep model in which all are set to eight-layer ResNet[He16] were prepared. In the separate model, the first and second neural networks 7, 8 for encoding into a context vector were separated from the third neural network 9, and loss functions were also separated. In order to separate the third neural network 9, an output (context vector) of the first neural network 7 was not used to estimate a potential interest, and an average word vector was used instead of an average sentence vector. As in the case of the unite model, the result of the second neural network 8 was used to select word vectors to be averaged. The test was carried out in four settings, that is, a separate shallow model, a separate deep model, a unite shallow model and a unite deep model. These models are combinations of the above-described models. Tests using the following two techniques were carried out as a baseline technique.

Baseline 1

A potential interest is estimated based on a similarity with a noun in a dialog log as a word similarity baseline. In this technique, all the nouns contained in a dialog log are converted into word vectors by Word2Vec, and whether "interested" or "indeterminate or uninterested" is determined based on a cosine similarity between an average of the word vectors and a vector of a potential interest estimation noun. Evaluation is made while changing a similarity threshold from 0.0 to 1.0 in 0.1 steps, and a result at the maximum F-measure is defined as the result of this technique.

Baseline 2: SVM

A determination using an SVM is carried out as another baseline. In this technique, a vector obtained by connecting an average vector used in a word similarity of Baseline 1 to a vector of a potential interest estimation noun is set for an input vector, and whether there is a potential interest is classified into two classes with the SVM.

Next, the test results will be described in detail. FIG. 11 is a table that shows the test results. As shown in FIG. 11, the F-measure of the unite deep model is the highest, and subsequently the F-measure decreases in order of the unite shallow model, the separate shallow model and the separate deep model. This technique exhibited more excellent performance than the word similarity or the SVM in the above-described baseline technique.

In the technique using a word similarity, it is presumable that since all the nouns contained in a dialog log were used, many words regardless of whether there is an interest were used in calculation of an average word vector, so performance was low.

The reason why the neural net-based interest determination method was more excellent than the SVM-based technique is presumably that the four neural net-based models utilize context information of a speech with the use of RNN; whereas the SVM model performs estimation by focusing on only nouns in a speech.

When the neural net-based models are compared with each other, the unite shallow model or the unite deep model exhibits a more excellent estimation result than the separate shallow model or the separate deep model.

It appears from the results that the interest determination method according to the present embodiment, in which two accumulated deviations are united and a whole model is caused to learn, was effective. When focusing on a difference between the shallow model and the deep model, the shallow model exhibits a larger F-measure and a better result than the deep model in the separate model. On the other hand, in the unite model, the deep model exhibits a slightly large F-measure and a better result than the shallow model. Particularly, the unite deep model exhibits the best result among all the techniques. It suggested from this results that a combination of a neural network having a large number of layers with the unite model was effective.

FIG. 12 is a view partially excerpted from the first half of a dialog used in the test. FIG. 13 shows part of results from a determination as to a potential interest, carried out with the unite model on potential interest estimation nouns extracted from the second half of the dialog. FIG. 14 shows part of results from a determination with the SVM. In FIG. 13 and FIG. 14, circle mark denotes "interested", and cross mark denotes "indeterminate or uninterested".

It is clear from a dialog example that User 1 and User 2 both are interested in alcohol. For this reason, it is presumable that User 1 and User 2 have a certain interest in nibbles for alcohol. It appears that the neural networks according to the present embodiment and the SVM both were able to carry out proper interest determination on "cheese", "smoked food" and "raw ham". The neural networks according to the present embodiment were able to properly determine that User 1 was interested in things related to music, such as "musical instrument" and "guitar" and User 2 was not interested in things related to music so much. On the other hand, it appears that the SVM failed to carry out determination on a speaker-by-speaker basis and determined that User 1 and User 2 both were interested in words "cheese", "musical instrument" and "guitar" that are common words between the users. From the above results, it was found that the neural networks according to the present embodiment were able to correctly determine a potential interest on a user-by-user basis.

In the interest determination system according to the present embodiment, the third neural network 9 learns by using an input value and an output value while the input value is set to vector information that associates vector information of a taste model indicating a taste of a user with a vector of a predetermined word set in advance and the output value is set to information indicating whether there is an interest of the user. Vector information that associates vector information indicating a feature of a word to be determined with the vector information of the taste model is input to the third neural network 9. The interest determination unit 6 determines whether there is an interest of the user in the word to be determined, based on an output value output from the third neural network 9.

Thus, the third neural network 9 is caused to learn by using the vector information that associates the taste model, in which a taste of the user was comprehensively compiled, with a selected predetermined word that has not appeared in dialog information. Therefore, not only a taste based on a word that appears in dialog information and in which the user expresses interest but also a taste based on a predetermined word including a word that does not appear in the dialog information and in which the user expresses interest is incorporated in the third neural network 9. That is, by determining whether there is an interest of a user in a word to be determined with the use of the third neural network 9, it is possible to highly accurately determine whether there is an interest of the user in not only a word that appears in a dialog of the user but also a word that does not appear in the dialog.

The disclosure is not limited to the above-described embodiments. The above-described embodiments may be modified as needed without departing from the scope of the disclosure. For example, in the above-described embodiments, the components (the morphological analysis unit 2, the word vector conversion unit 3, the sentence vector generating unit 4, the taste model generating unit 5, the interest determination unit 6, and the first to third neural networks 7, 8, 9) included in the interest determination system 1 and the data for learning, shown in FIG. 4, and the like, may be provided not only in the case where those are enclosed in one system, the CPU, or the like, but also in the case where a CPU or a PC is provided for each or any combination of them, or may be connected to one another via a communication line.

The disclosure is applicable that the process shown in FIG. 9 is implemented by, for example, causing the CPU to execute a computer program.

The program may be stored in various types of non-transitory computer-readable medium and supplied to a computer. The non-transitory computer-readable medium includes various types of tangible storage medium. Examples of the non-transitory computer-readable medium include a magnetic recording medium (for example, a flexible disk, a magnetic tape, or a hard disk drive), a magnetooptical medium (for example, a magnetooptical disk), a CD-read only memory (ROM), a CD-R, a CD-R/W, and a semiconductor memory (for example, a mask ROM, a programmable ROM (PROM), an erasable PROM (EPROM), a flash ROM, or a random access memory (RAM)).

The program may be supplied to a computer via various types of transitory computer-readable medium. Examples of the transitory computer-readable medium include an electrical signal, an optical signal, and an electromagnetic wave. The transitory computer-readable medium is able to supply the program to a computer via a wired communication path, such as an electric wire and an optical fiber, or a wireless communication path.

What is claimed is:

1. An interest determination system comprising:
circuitry configured to:
acquire a first data group indicating a feature of each word contained in dialog information on a user, the first data group being first vector information that is expressed as quantified and vectorized information of the feature of each word contained in the dialogue of the user;
cause a first neural network to learn by using a first input value and a first output value, the first input value being set to a data group that associates the first data group with a second data group indicating a feature of a predetermined word, the first output value being set to information indicating whether there is an interest of the user, the first neural network being a recurrent neural network;
determine, when a data group that associates a third data group indicating a feature of a word to be determined with the first data group has been input to the first neural network, whether there is the interest of the user in the word to be determined based on an output value output from the first neural network;
cause the first neural network to learn by using the first input value and the first output value, the first input value being set to vector information that associates the first vector information with second vector information as the second data group indicating the feature of the predetermined word set in advance, the first output value being set to information indicating whether there is the interest of the user; and
determine, when vector information that associates third vector information indicating the feature of the word to be determined with the first vector information has been input to the first neural network, whether there is the interest of the user in the word to be determined based on an output value output from the first neural network.

2. The interest determination system according to claim 1, wherein the first data group is a taste model that expresses the feature of each word contained in the dialog information of the user as a model indicating a taste of the user.

3. The interest determination system according to claim 2, wherein the circuitry is configured to:
convert an interest estimation word, a preceding context word, and a following context word within the dialog information of the user into vectors of the words, the interest estimation word being a word in which the user is interested, the preceding context word being a word a predetermined number of words before the interest estimation word, and the following context word being a word a predetermined number of words behind the interest estimation word;
convert the vector of the preceding context word to a preceding context vector using a second neural network;
convert the vector of the following context word to a following context vector using the second neural network, the preceding context vector and the following context vector each indicating a feature of a sentence; and
generate a connected vector obtained by connecting the converted preceding context vector and the converted following context vector to the vector of the interest estimation word.

4. The interest determination system according to claim 3, wherein the circuitry is configured to:
generate the connected vector for each of pieces of dialog information in which the user is interested; and
calculate an average of the connected vectors as vector information of the user in the taste model.

5. The interest determination system according to claim 3, wherein the circuitry is configured to cause a third neural network to learn by using a second input value and a second output value, the second input value being set to the connected vector, the second output value being set to information indicating whether there is the interest of the user.

6. The interest determination system according to claim 5, wherein circuitry is configured to cause the first neural network, the second neural network, and the third neural network to learn at the same time.

7. The interest determination system according to claim 5, wherein the first neural network, the second neural network, and the third neural network each are a separate neural network.

8. The interest determination system according to claim 2, wherein the second neural network is two-dimensional probability distribution configured as a fully-connected layer neural network.

9. The interest determination system according to claim 8, wherein the second neural network has at least eight layers.

10. The interest determination system according to claim 5, wherein the third neural network is configured as a fully-connected layer neural network.

11. An interest determination method comprising:
acquiring a first data group indicating a feature of each word contained in dialog information on a user, the first data group being first vector information that is expressed as quantified and vectorized information of the feature of each word contained in the dialogue of the user;
causing a first neural network to learn by using a first input value and a first output value, the first input value being set to a data group that associates the first data group with a second data group indicating a feature of a predetermined word, the first output value being set to information indicating whether there is an interest of the user, the first neural network being a recurrent neural network;
when a data group that associates a third data group indicating a feature of a word to be determined with the first data group has been input to the first neural network, determining whether there is the interest of the user in the word to be determined, based on an output value output from the first neural network; and
causing the first neural network to learn by using the first input value and the first output value, the first input value being set to vector information that associates the first vector information with second vector information as the second data group indicating the feature of the predetermined word set in advance, the first output value being set to information indicating whether there is the interest of the user; and
determining, when vector information that associates third vector information indicating the feature of the word to be determined with the first vector information has been input to the first neural network, whether there is the interest of the user in the word to be determined based on an output value output from the first neural network.

12. A non-transitory computer-readable storage medium including a storage configured to store a computer program, wherein, when the computer program is executed, the computer program causes a computer to execute instructions for:
  i) acquiring a first data group indicating a feature of each word contained in dialog information on a user, the first data group being first vector information that is expressed as quantified and vectorized information of the feature of each word contained in the dialogue of the user;
  ii) causing a first neural network to learn by using a first input value and a first output value, the first input value being set to a data group that associates the first data group with a second data group indicating a feature of a predetermined word, the first output value being set to information indicating whether there is an interest of the user, the first neural network being a recurrent neural network;
  iii) when a data group that associates a third data group indicating a feature of a word to be determined with the first data group has been input to the first neural network, determining whether there is the interest of the user in the word to be determined, based on an output value output from the first neural network;
  iv) causing the first neural network to learn by using the first input value and the first output value, the first input value being set to vector information that associates the first vector information with second vector information as the second data group indicating the feature of the predetermined word set in advance, the first output value being set to information indicating whether there is the interest of the user; and
  v) determining, when vector information that associates third vector information indicating the feature of the word to be determined with the first vector information has been input to the first neural network, whether there is the interest of the user in the word to be determined based on an output value output from the first neural network.

* * * * *